July 1, 1930.  W. H. JONES  1,769,841

SILICA CRUCIBLE

Filed June 8, 1929

Inventor:
William H. Jones,
by Charles E. Tullar
His Attorney.

Patented July 1, 1930

1,769,841

UNITED STATES PATENT OFFICE

WILLIAM H. JONES, OF SCHENECTADY, NEW YORK, ASSIGNOR TO GENERAL ELECTRIC COMPANY, A CORPORATION OF NEW YORK

SILICA CRUCIBLE

Application filed June 8, 1929. Serial No. 369,389.

This invention relates to a new and improved silica product, and to the method of producing the same.

One object of this invention is to provide a silica crucible of the Gooch type.

Another object of this invention is to provide a simple and practical method of producing such a crucible.

Silica does not lend itself to those methods ordinarily employed in producing Gooch crucibles. In the ordinary manufacture of crucibles of this type, which are usually made of porcelain, the portion constituting the bottom is perforated during the manufacture of the crucible while the porcelain is in the plastic state. In this state the perforations may be formed in the mold with finger elements. Or the formed porcelain crucible may be drilled or punched to provide the necessary perforations in the bottom thereof. The inherent characteristics of silica render such methods impracticable in the manufacture of silica Gooch crucibles.

I have discovered a method whereby I can produce a silica crucible of the Gooch type which will be simple, yet practical, and which will provide an excellent product.

In the accompanying drawing which forms part of this specification,

Figure 4:
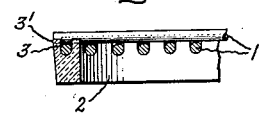
Figure 4 is a fragmentary cross-section of a portion of the bottom of the crucible showing more in detail the lattice work construction in relation to the retaining ring therefor.
Figure 5:
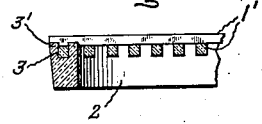
Figure 5 is a view similar to Figure 4, but in which the rods of the lattice work construction are square in cross-section instead of round.

In carrying out my invention I first form a lattice work of rods, 1, of any suitable size of vitreous silica either in the opaque or clear state. Clear vitreous silica also is known commercially as "fused quartz." To form this lattice work I place a series of silica rods on a retaining ring, 2, which is formed of silica. This retaining ring has all along its circumference two series of seats or notches, 3—3', formed therein, which are arranged at right angles to each other and one above the other so that one series of rods will be at right angles to the other series, and one series above the other when in position. The seats, 3—3', are spaced apart sufficiently to give the desired size of aperture between the rods when they are fused in place. The rods are welded or fused together in any suitable manner, and the ends thereof are similarly secured to the retaining ring, 2, within the seats, 3—3', thus completing the bottom of the crucible. The bottom thus made is secured to one end, as at 4, of a tubular member, 5, in any suitable manner, as by fusion, and with this step the crucible is completed. The tubular member 5 may be a piece of silica tubing of the desired size, or it may be an ordinary crucible shaped member. The shape of the silica rods used may vary. Instead of rods which are circular in cross-section, as shown in Figure 4, rods which are squared in cross-section may be substituted, as shown in Figure 5, at 1'.

Figure 1:
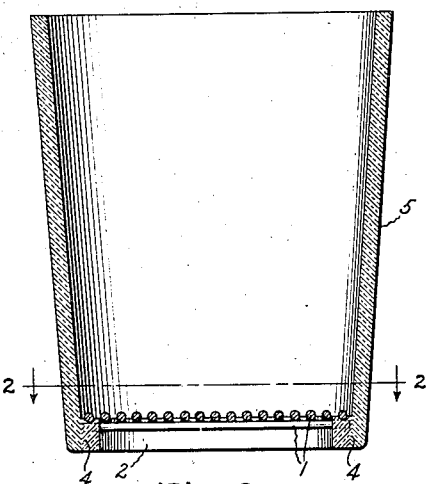
Figure 1 is a longitudinal cross-section through a preferred form of crucible of my invention.
Figure 3:
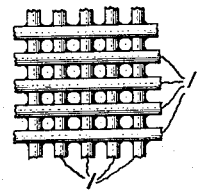
Figure 3 is an enlarged fragmentary plan view of a portion of the bottom of the crucible showing in detail the lattice work construction thereof.
Figure 2:
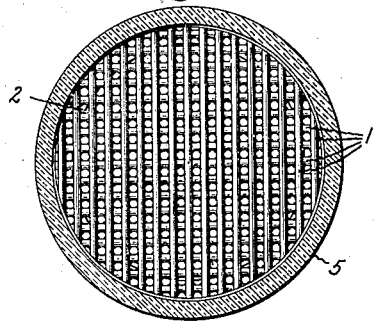
Figure 2 is a cross-section taken on line 2—2 of Figure 1, looking in the direction of the arrows.
Figure 6:
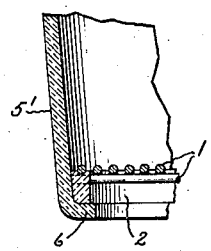
Figure 6 is a fragmentary sectional view of a modified type of crucible having a removable bottom.

If desired, a crucible having a removable bottom may be made in accordance with the method outlined above. The construction of such a crucible is shown in Figure 6. It may be made by using a containing element of substantially the same shape as the member 5 of the crucible shown in Figure 1. This member is designated as 5' in Figure 6 and is provided at one end with a flanged portion, 6, which may be formed integral therewith. The retaining ring containing the lattice work construction is placed on this flange, and the crucible is then complete. This type is useful where a removable bottom is desired. The advantage of a removable bottom is that the crucible may be more easily cleaned.

What I claim as new and desire to secure by Letters Patent of the United States is:

1. A silica crucible of the Gooch type comprising a tubular member provided at one end thereof with a lattice work of silica rods.

2. A silica crucible of the Gooch type comprising a silica crucible-shaped member having secured to one end thereof a lattice work of silica rods.

3. A silica crucible of the Gooch type comprising a silica tubular member having fused at one end thereof a silica retaining ring, said retaining ring having a lattice work of silica rods secured thereto.

4. In a silica crucible of the Gooch type, a bottom portion consisting of a silica retaining ring provided with a series of seats along its circumference, one series of seats being formed at right angles to, and above the other series of seats, and silica rods fixed in said seats and secured together to form a lattice work construction.

5. The method of making a silica crucible of the Gooch type, which consists in forming a lattice work of silica rods, securing said lattice work to a silica retaining ring, and seating said retaining ring on one end of a silica tubular member.

6. The method of making a silica crucible of the Gooch type which consists in forming a lattice work of silica rods, securing said lattice work to a silica retaining ring, and finally attaching said retaining ring to a silica crucible shaped member.

In witness whereof, I have hereunto set my hand this 7th day of June, 1929.

WILLIAM H. JONES.